United States Patent
Goethals et al.

(10) Patent No.: US 10,286,708 B2
(45) Date of Patent: *May 14, 2019

(54) LASER MARKABLE COMPOSITIONS, ARTICLES AND DOCUMENTS

(71) Applicant: AGFA-GEVAERT, Mortsel (BE)

(72) Inventors: Fabienne Goethals, Mortsel (BE); Johan Loccufier, Mortsel (BE); Dirk Kokkelenberg, Mortsel (BE); Lionel Petton, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/574,552

(22) PCT Filed: May 18, 2016

(86) PCT No.: PCT/EP2016/061069
§ 371 (c)(1),
(2) Date: Nov. 16, 2017

(87) PCT Pub. No.: WO2016/184881
PCT Pub. Date: Nov. 24, 2016

(65) Prior Publication Data
US 2018/0154667 A1   Jun. 7, 2018

(30) Foreign Application Priority Data

May 19, 2015   (EP) .................................... 15168086

(51) Int. Cl.
| | | |
|---|---|---|
| *B41M 5/333* | (2006.01) | |
| *B41M 5/323* | (2006.01) | |
| *B41M 3/14* | (2006.01) | |
| *B41M 5/337* | (2006.01) | |
| *B41M 5/41* | (2006.01) | |
| *B41M 5/42* | (2006.01) | |
| *B41M 5/44* | (2006.01) | |
| *B41M 5/46* | (2006.01) | |
| *C08L 27/08* | (2006.01) | |
| *C08L 33/24* | (2006.01) | |
| *C08L 39/04* | (2006.01) | |
| *C08L 75/02* | (2006.01) | |
| *C08L 75/04* | (2006.01) | |

(52) U.S. Cl.
CPC ............ *B41M 5/323* (2013.01); *B41M 3/142* (2013.01); *B41M 5/3331* (2013.01); *B41M 5/3333* (2013.01); *B41M 5/3336* (2013.01); *B41M 5/3375* (2013.01); *B41M 5/41* (2013.01); *B41M 5/426* (2013.01); *B41M 5/44* (2013.01); *B41M 5/465* (2013.01); *C08L 27/08* (2013.01); *C08L 33/24* (2013.01); *C08L 39/04* (2013.01); *C08L 75/02* (2013.01); *C08L 75/04* (2013.01); *B41M 5/3372* (2013.01); *B41M 2205/04* (2013.01)

(58) Field of Classification Search
CPC ........ B41M 3/14; B41M 3/142; B41M 5/323; B41M 5/333; B41M 5/3331; B41M 5/3333; B41M 5/3336; B41M 5/46; B41M 5/465; B41M 2205/04; B41J 2/44; B41J 2/442; B42D 25/23; B42D 25/382; B42D 25/387; B42D 25/41
USPC ........................................................ 503/215
See application file for complete search history.

(56) References Cited

U.S. PATENT DOCUMENTS

| | | |
|---|---|---|
| 4,720,449 A | 1/1988 | Borror et al. |
| 5,409,797 A | 4/1995 | Hosoi et al. |
| 6,265,344 B1 | 7/2001 | Shimbo et al. |

FOREIGN PATENT DOCUMENTS

| | | |
|---|---|---|
| EP | 0 279 104 A1 | 8/1988 |
| EP | 0 327 409 A2 | 8/1989 |
| EP | 1 398 169 A1 | 3/2004 |
| EP | 2 181 858 A1 | 5/2010 |
| EP | 2 567 825 A1 | 3/2013 |
| EP | 2 617 710 A1 | 7/2013 |
| EP | 2 719 540 A1 | 4/2014 |
| EP | 2 719 541 A1 | 4/2014 |
| EP | 2 648 920 B1 | 3/2015 |
| JP | 59-68296 A | 4/1984 |
| JP | 01-214473 A | 8/1989 |

OTHER PUBLICATIONS

Official Communication issued in International Patent Application No. PCT/EP2016/061069, dated Nov. 9, 2016.

*Primary Examiner* — Bruce H Hess
(74) *Attorney, Agent, or Firm* — Keating and Bennett, LLP

(57) ABSTRACT

A laser markable composition includes (a) an aqueous medium; (b) capsules composed of a polymeric shell surrounding a core; (c) a color developing agent or color developing agent precursor; and (d) an optothermal converting agent; characterized in that the core of the capsule contains a leuco dye.

12 Claims, No Drawings

LASER MARKABLE COMPOSITIONS, ARTICLES AND DOCUMENTS

CROSS REFERENCE TO RELATED APPLICATIONS

This application is a 371 National Stage Application of PCT/EP2016/061069, filed May 18, 2016. This application claims the benefit of European Application No. 15168086.5, filed May 19, 2015, which is incorporated by reference herein in its entirety.

BACKGROUND OF THE INVENTION

1. Field of the Invention

This invention relates to aqueous laser markable compositions and to articles made therefrom.

2. Description of the Related Art

Various substrates, for example paper, paperboard or plastics, are very often marked with information such as logos, bar codes, expiry dates or batch numbers.

Traditionally, the marking of these substrates has been achieved by various printing techniques, such as for example inkjet or thermal transfer printing. However, these printing techniques are more and more replaced by laser marking as laser marking is cheaper in terms of overall economics and shows performance benefits such as high speed and contact free marking, marking of substrates with uneven surfaces, creation of marks that are so small that they are invisible or nearly invisible to the human eye, and creation of marks in the substrate rather than on the substrates.

Security cards are widely used for various applications such as identification purposes (ID cards) and financial transfers (credit cards). Such cards typically consist of a laminated structure consisting of various paper or plastic laminates and layers wherein some of them may carry alphanumeric data and a picture of the card holder. So called 'smart cards' can also store digital information by including an electronic chip in the card body. A principal objective of such security cards is that they cannot be easily modified or reproduced in such a way that the modification or reproduction is difficult to distinguish from the original.

Laser marking is perceived a secure way to add information on a security document as it is capable of producing the information "inside" the security document.

Well known in the field of laser markable security documents is the use of laser markable polymeric supports. Laser marking produces a colour change from white to black in a laser markable support through carbonization of the polymer, usually polycarbonate as disclosed in e.g. EP-A 2181858.

During the past last years, there is an increased interest of using laser markable layers. The advantage of using a laser markable layer coated on a support instead of a laser markable support, is that a support can be used which has better physical properties than the laser markable supports, such as for example a higher flexibility than a polycarbonate support as disclosed in e.g. EP-A 2567825.

There is also an increased interest in using laser marking to produce coloured images, for example in security documents, but also in various other applications. Therefore, laser markable layers are used which are composed of colour forming compounds (also called "leuco-dyes") which can change from essentially colourless or pale-coloured to coloured when exposed to for example heat, such as disclosed in for example EP-A 2648920.

The colour laser markable layers may comprise an infrared absorbing dye (IR dye) or an infrared absorbing pigment (IR pigment), both absorbing the IR radiation and converting it into heat.

An advantage of using IR dyes is that the absorption spectrum of an IR dye tends to be narrower than that of an IR pigment. This allows the production of multicoloured articles and security documents from precursors having a plurality of laser markable layers containing different IR dyes and colour forming compounds. The IR dyes having a different maximum absorption wavelength can then be addressed by IR lasers with corresponding emission wavelengths causing colour formation only in the laser markable layer of the addressed IR dye. Such multicolour articles have been disclosed in for example U.S. Pat. No. 4,720,449, EP-A 2719540 and EP-A 2719541.

Laser marking may also be used to write personalized information onto various articles, such as mobile phones, cars, etc. Here, the major advantage of laser marking compared to for example printing techniques such as inkjet printing, flexographic printing or screen printing is the fact that the information is written "inside" the article instead of "on top" of the article.

A disadvantage of laser markable materials disclosed in for example EP-A 2719541 is the fact that the laser markable layers are prepared from non-aqueous coating solutions making their production more cumbersome regarding health and safety regulations.

Another problem of laser markable materials comprising a colour forming compound and a colour developer is often their poor daylight stability. When such articles are exposed to daylight for a long time, a background stain becomes more and more pronounced.

SUMMARY OF THE INVENTION

Preferred embodiments of the invention provide a laser markable article having a simplified and more environmently friendly preparation method while maintaining or even improving their physical properties and daylight stability.

These advantages and benefits have been realized with the colour laser markable composition as defined below.

Further advantages and embodiments of the present invention will become apparent from the following description.

DETAILED DESCRIPTION OF THE PREFERRED EMBODIMENTS

Definitions

The terms polymeric support and foil, as used herein, mean a self-supporting polymer-based sheet, which may be associated with one or more adhesion layers, e.g. subbing layers. Supports and foils are usually manufactured through extrusion.

The term layer as used herein, is considered not to be self-supporting and is manufactured by coating or spraying it on a (polymeric) support or foil.

The term leuco dye as used herein refers to compounds which can change from essentially colourless or pale-coloured to coloured when irradiated with UV light, IR light and/or heated.

PET is an abbreviation for polyethylene terephthalate.

PETG is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

PET-C is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the Glossary of Security Documents—Security features and other related technical terms as published by the Consilium of the Council of the European Union on Aug. 25, 2008 (Version: v.10329.02.b.en) on its website: http://www.consilium.europa.eu/prado/EN/glossaryPopup.html.

The term security document precursor as used herein refers to the fact that one or more security features still have to be applied to the precursor, for example laser marking, in order to obtain the final security document.

The term alkyl means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term alkoxy means all variants possible for each number of carbon atoms in the alkyl group i.e. methoxy, ethoxy, for three carbon atoms: n-propoxy and isopropoxy; for four carbon atoms: n-butoxy, isobutoxy and tertiary-butoxy etc.

The term aryloxy means Ar—O— wherein Ar is an optionally substituted aryl group.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl group or a naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulfur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulfur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term substituted, in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulfonamide, —Cl, —Br, —I, —OH, —SH, —CN and —NO$_2$.

Laser Markable Composition

The laser markable composition according to a preferred embodiment of the present invention comprises
(a) an aqueous medium;
(b) capsules composed of a polymeric shell surrounding a core;
(c) a colour developing agent; and
(d) an optothermal converting agent;
characterized in that the core of the capsule contains a leuco dye.

An aqueous composition within the meaning of the invention is a composition of which the liquid phase contains preferably at least 50 wt %, more preferably at least 75 wt %, most preferably at least 90 wt % of water.

Optothermal Converting Agent

An optothermal converting agent generates heat upon absorption of radiation. The optothermal converting agent preferably generates heat upon absorption of infrared radiation.

The optothermal converting agent is preferably an infrared absorbing dye, an infrared absorbing pigment, or a combination thereof.

Infrared Absorbing Dyes

Suitable examples of infrared absorbing dyes (IR dyes) include, but are not limited to, polymethyl indoliums, metal complex IR dyes, indocyanine green, polymethine dyes, croconium dyes, cyanine dyes, merocyanine dyes, squarylium dyes, chalcogeno-pyryloarylidene dyes, metal thiolate complex dyes, bis(chalcogenopyrylo)-polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

Preferred infrared absorbing dyes are polymethine dyes due to their low absorption in the visible region and their selectivity, i.e. narrow absorption peak in the infrared region. Particular preferred polymethine infrared dyes are cyanine infrared dyes.

Preferred infrared absorbing dyes having an absorption maximum of more than 1100 nm are those disclosed in EP-A 2722367, paragraphs [0044] to [0083] and the unpublished EP-A 14166498.7 (filed on Apr. 30, 2014).

Infrared absorbing dyes having an absorption maximum between 1000 nm and 1100 nm are preferably selected from the group consisting of quinoline dyes, indolenine dyes, especially a benzo[cd]indoline dye. A particularly preferred infrared dye is 5-[2,5-bis[2-[1-(1-methylbutyl)-benz[cd]indol-2(1H)-ylidene]ethylidene]-cyclopentylidene]-1-butyl-3-(2-methoxy-1-methylethyl)-2,4,6(1H,3H,5H)-pyrimidinetrione (CASRN 223717-84-8) represented by the Formula IR-1:

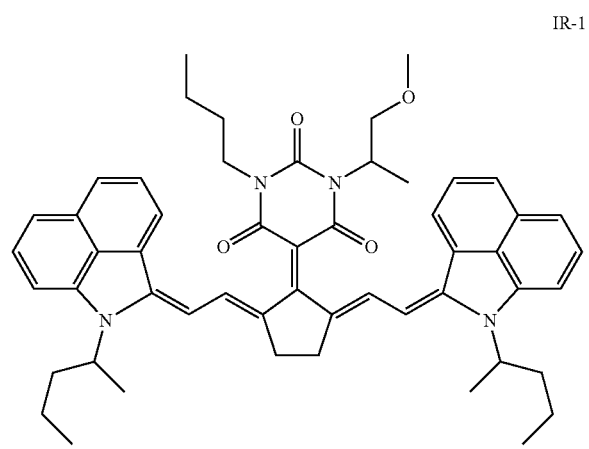 [SMILES: CCCCN1C(=O)/C(=C2C(=C/C=c3\c4cccc5cccc(c54)n3C(C)CCC)\CCC\2=C/C=c2\c3cccc4cccc(c43)n2C(C)CCC)C(=O)N(C(C)COC)C1=O]

IR-1

The infrared absorbing dyes IR-1 has an absorption maximum $\lambda_{max}$ of 1052 nm making it very suitable for a Nd-YAG laser having an emission wavelength of 1064 nm.

Infrared absorbing dyes having an absorption maximum between 830 nm and 1000 nm are preferably selected from the group consisting of quinoline dyes, indolenine dyes, especially benzo[e]indolenine dyes, and benzo[f]indolenine dyes.

An advantage of using infrared absorbing dyes is that the absorption spectrum of an infrared absorbing dye tends to be narrower than that of an Infrared absorbing pigment. This allows the production of multicoloured articles and security documents from precursors having a plurality of laser markable layers containing different IR dyes and colour forming compounds. The IR dyes having a different maximum absorption wavelength can then be addressed by IR lasers with corresponding emission wavelengths causing colour formation only in the laser markable layer of the addressed IR dye. Such multicolour articles have been disclosed in for example U.S. Pat. No. 4,720,449, EP-A 2719540 and EP-A 2719541.

The amount of the IR dyes is preferably between 0.005 and 1.000 g/m², more preferably between 0.010 and 0.500 g/m², most preferably between 0.015 and 0.050 g/m². Enough IR dye has to be present to ensure sufficient colour density formation upon exposure to IR radiation. However, using too much IR dye may result in unwanted background colouration of the laser markable materials.

Water soluble infrared dyes can be added as such to the aqueous composition. However, preferred infrared dyes are often not, or slightly, soluble in aqueous media. Such infrared dyes are preferably added to the laser markable composition as an aqueous dispersion or emulsion.

Infrared Absorbing Pigments

Suitable examples of infrared absorbing pigments include but are not limited to carbon black such as acetylene black, channel black, furnace black, lamp black, and thermal black; oxides, hydroxides, sulfides, sulfates and phosphates of metals such as copper, bismuth, iron, nickel, tin, zinc, manganese, zirconium, tungsten, lanthanum, and antimony including lanthane hexaboride, indium tin oxide (ITO) and antimony tin oxide, titanium black and black iron oxide.

The infrared dye classes disclosed above may also be used as infrared absorbing pigments, for example cyanine pigment, merocyanine pigment, etc.

A preferred infrared absorbing pigment is carbon black.

The particle size of the pigment is preferably from 0.01 to 5 μm, more preferably from 0.05 to 1 μm.

The amount of the infrared absorbing pigment is between 10 and 1000 ppm, preferably between 25 and 750 ppm, more preferably between 50 and 500 ppm, most preferably between 100 and 250 ppm, all relative to the total dry weight of the laser markable layer. An amount of infrared absorbing pigment above 1000 ppm results in a too high background density of the laser markable article.

Aqueous dispersions of carbon black are preferably used in the present invention. Examples of such aqueous carbon black dispersions are CAB-O-JET® 200 and 300 from CABOT.

Capsules

The capsules have preferably an average particle size of not more than 5 μm, more preferably of not more than 2 μm, most preferably of not more than 1 μm as determined by dynamic laser diffraction. Capsules having an average particle size smaller than 1 μm are typically called nanocapsules while capsules having an average particle size above 1 μm are typically called microcapsules.

Upon exposure, a rupture of the capsule, for example by heat produced by an optothermal converting agent upon absorption of IR radiation, results in a reaction between the leuco dye and a colour developing agent which then triggers colour formation.

The morphology of capsules and their preparation methods have been reviewed, for example, by Jyothi Sri.S in the International Journal of Pharma and Bio Sciences (Vol. 3, Issue 1, January-March 2012).

The capsules may have different morphologies, dependent on the preparation method of the capsules. For example mononuclear capsules have a shell around a core while polynuclear capsules have multiple cores enclosed within the shell. Matrix encapsulation refers to a core material which is homogeneously distributed into the shell.

Hydrophilic polymers, surfactants and/or polymeric dispersants may be used to obtain stable dispersions of the capsules in an aqueous medium and to control the particle size and the particle size distribution of the capsules.

In a preferred embodiment, the capsules are dispersed in the aqueous medium using a dispersing group covalently bonded to the polymeric shell. The dispersing group is preferably selected from a group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

The dispersing groups stabilize the aqueous dispersion by electrostatic stabilization. For example, a slightly alkaline aqueous medium will turn the carboxylic acid groups covalently bonded to the polymeric shell into ionic groups, whereafter the negatively charged capsules have no tendency to agglomerate. If sufficient dispersing groups are covalently bonded to the polymeric shell, the capsule becomes a so-called self-dispersing capsule. Other dispersing groups such as sulfonic acid groups tend to be dissociated even in acid aqueous medium and thus do not require the addition of an alkali.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability is accomplished solely by electrostatic stabilization.

The capsules may also be stabilized by solid particles which adsorb onto the shell. Preferred solid particles are colloidal silica.

There is no real limitation on the type of polymer used for the polymeric shell of the capsule. Preferably, the polymer used in the polymeric shell is crosslinked. By crosslinking, more rigidity is built into the capsules allowing a broader range of temperatures and pressures for handling the colour laser markable article.

Preferred examples of the polymeric shell material include polyureas, polyacrylates, polymethacrylates, polyurethanes, polyesters, polycarbonates, polyamides, melamine based polymers and mixtures thereof, with polyureas and polyurethanes being especially preferred.

Capsules can be prepared using both chemical and physical methods. Suitable encapsulation methodologies include complex coacervation, liposome formation, spray drying and polymerization methods.

In a preferred embodiment of the present invention, preferably a polymerization method is used as it allows the highest control in designing the capsules. More preferably interfacial polymerization is used to prepare the capsules used in the invention. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerization is a particularly preferred technology for the preparation of capsules according to a preferred embodiment of the present invention. In interfacial polymerization, such as interfacial polycondensation, two reactants meet at the interface of the emulsion droplets and react rapidly.

In general, interfacial polymerization requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerization. The capsules according to a preferred embodiment of the present invention are preferably prepared from an oleophilic dispersion in an aqueous continuous phase.

Typical polymeric shells, formed by interfacial polymerization are selected from the group consisting of polyamides, typically prepared from di- or oligoamines as first shell component and di- or poly-acid chlorides as second shell component; polyurea, typically prepared from di- or oligoamines as first shell component and di- or oligoisocyanates as second shell component; polyurethanes, typically prepared from di- or oligoalcohols as first shell component and di- or oligoisocyanates as second shell component; polysulfonamides, typically prepared from di- or oligoamines as first shell component and di- or oligosulfochlorides as second shell component; polyesters, typically prepared from di- or oligoalcohols as first shell component and di- or oligo-acid chlorides as second shell component; and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligoisocyanate, a di- or oligo acid chloride, a di- or oligochloroformate and an epoxy resin as second shell component.

In a particularly preferred embodiment, the shell is composed of a polyurethane, a polyurea or a combination thereof.

In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent. A preferred organic solvent is ethyl acetate, because it also has a low flammability hazard compared to other organic solvents.

A water immiscible solvent is an organic solvent having low miscibility in water. Low miscibility is defined as any water solvent combination forming a two phase system at 20° C. when mixed in a one over one volume ratio.

The method for preparing a dispersion of capsules preferably includes the following steps:

a) preparing a non-aqueous solution of a first shell component for forming a polymeric shell, a leuco dye, and optionally a water immiscible organic solvent having a lower boiling point than water;

b) preparing an aqueous solution of a second shell component for forming the polymeric shell;

c) dispersing the non-aqueous solution under high shear in the aqueous solution;

d) optionally stripping the water immiscible organic solvent from the mixture of the aqueous solution and the non-aqueous solution; and e) preparing the polymeric shell around the leuco dye by interfacial polymerization of the first and second shell components for forming the polymeric shell.

The optothermal converting agent may be added together with the leuco dye in step (a) to the non-aqueous solution resulting in capsules wherein both the leuco dye and the optothermal converting agent are located in the core of the capsule.

Colour Developing Agent

Upon absorption of infrared radiation, the optothermal converting agent converts that radiation into heat. The heat then disrupts the capsules whereupon the leuco dye comes into reactive contact with a colour developing agent which then triggers the colour formation.

Various electron accepting substances may be used as colour developing agent in the present invention. Examples thereof include phenolic compounds, organic or inorganic acidic compounds and esters or salts thereof.

Specific examples include bisphenol A; tetrabromobisphenol A; gallic acid; salicylic acid; 3-isopropyl salicylate; 3-cyclohexyl salicylate; 3-5-di-tert-butyl salicylate; 3,5-di-α-methyl benzyl salicylate; 4,4'-isopropylidenediphenol;

1,1'-isopropylidene bis(2-chlorophenol); 4,4'-isopropylene bis(2,6-dibromo-phenol); 4,4'-isopropylidene bis(2,6-dichlorophenol); 4,4'-isopropylidene bis(2-methyl phenol); 4,4'-isopropylidene bis(2,6-dimethyl phenol); 4,4'-isopropylidene bis(2-tert-butyl phenol); 4,4'-sec-butylidene diphenol; 4,4'-cyclohexylidene bisphenol; 4,4'-cyclohexylidene bis(2-methyl phenol); 4-tert-butyl phenol; 4-phenyl phenol; 4-hydroxy diphenoxide; α-naphthol; β-naphthol; 3,5-xylenol; thymol; methyl-4-hydroxybenzoate; 4-hydroxy-acetophenone; novolak phenol resins; 2,2'-thio bis(4,6-dichloro phenol); catechol; resorcin; hydroquinone; pyrogallol; fluoroglycine; fluoroglycine carboxylate; 4-tert-octyl catechol; 2,2'-methylene bis(4-chlorophenol); 2,2'-methylene bis(4-methyl-6-tert-butyl phenol); 2,2'-dihydroxy diphenyl; ethyl p-hydroxybenzoate; propyl p-hydroxybenzoate; butyl p-hydroxy-benzoate; benzyl p-hydroxybenzoate; p-hydroxybenzoate-p-chlorobenzyl; p-hydroxybenzoate-o-chlorobenzyl; p-hydroxybenzoate-p-methylbenzyl; p-hydroxybenzoate-n-octyl; benzoic acid; zinc salicylate; 1-hydroxy-2-naphthoic acid; 2-hydroxy-6-naphthoic acid; 2-hydroxy-6-zinc naphthoate; 4-hydroxy diphenyl sulphone; 4-hydroxy-4'-chloro diphenyl sulfone; bis(4-hydroxy phenyl)sulphide; 2-hydroxy-p-toluic acid; 3,5-di-tert-zinc butyl salicylate; 3,5-di-tert-tin butyl salicylate; tartaric acid; oxalic acid; maleic acid; citric acid; succinic acid; stearic acid; 4-hydroxyphthalic acid; boric acid; thiourea derivatives; 4-hydroxy thiophenol derivatives; bis(4-hydroxyphenyl) acetate; bis(4-hydroxyphenyl)ethyl acetate; bis(4-hydroxyphenyl)acetate-n-propyl; bis(4-hydroxy-phenyl)acetate-n-butyl; bis(4-hydroxyphenyl)phenyl acetate; bis(4-hydroxyphenyl)-benzyl acetate; bis(4-hydroxyphenyl)phenethyl acetate; bis(3-methyl-4-hydroxy-phenyl)acetate; bis(3-methyl-4-hydroxy-phenyl)methyl acetate; bis(3-methyl-4-hydroxyphenyl)acetate-n-propyl; 1,7-bis(4-hydroxyphenylthio)3,5-dioxaheptane; 1,5-bis(4-hydroxyphenylthio)3-oxaheptane; 4-hydroxy phthalate dimethyl; 4-hydroxy-4'-methoxy diphenyl sulfone; 4-hydroxy-4'-ethoxy diphenyl sulfone; 4-hydroxy-4'-isopropoxy diphenyl sulfone; 4-hydroxy-4'-propoxy diphenyl sulfone; 4-hydroxy-4'-butoxy diphenyl sulfone; 4-hydroxy-4'-isopropoxy diphenyl sulfone; 4-hydroxy-4'-sec-butoxy diphenyl sulfone; 4-hydroxy-4'-tert-butoxy diphenyl sulfone; 4-hydroxy-4'-benzyloxy diphenyl sulfone; 4-hydroxy-4'-phenoxy diphenyl sulfone; 4-hydroxy-4'-(m-methyl benzoxy) diphenyl sulfone; 4-hydroxy-4'-(p-methyl benzoxy)diphenyl sulfone; 4-hydroxy-4'-(o-methyl benzoxy)diphenyl sulfone; 4-hydroxy-4'-(p-chloro benzoxy)diphenyl sulfone and 4-hydroxy-4'-oxyaryl diphenyl sulfone.

A preferred colour developing agent is a metal salt of salicylate, for example zinc salicylate. A particularly preferred colour developing agent is zinc 3,5-bis(α-methylbenzyl) salicylate.

The colour developing agent may be present in the continuous phase of the laser markable composition or it may be present in the core of a capsule. However, when the colour developing agent is not, or slightly, soluble in aqueous media, it is preferred to add such a colour developing agent as an aqueous dispersion or emulsion.
Colour Developing Agent Precursor Also a so-called colour developing agent precursor may be used. Such a precursor forms a colour developing agent upon exposure to heat. Using a colour developing agent precursor instead of a colour developer may result in a better UV and heat stability of the laser markable compositon.

The colour developing agent precursor may be present in the continuous phase of the laser markable composition or it may be present in the core of a capsule. However, when the colour developing agent is not, or slightly, soluble in aqueous media, it is preferred to add such a colour developing agent as an aqueous dispersion or emulsion.

All publicly-known thermal acid generators can be used as colour developing agent precursor. Thermal acid generators are for example widely used in conventional photoresist material. For more information see for example "Encyclopaedia of polymer science", 4$^{th}$ edition, Wiley or "Industrial Photoinitiators, A Technical Guide", CRC Press 2010.

Preferred classes of photo- and thermal acid generators are iodonium salts, sulfonium salts, ferrocenium salts, sulfonyl oximes, halomethyl triazines, halomethylarylsulfone, α-haloacetophenones, sulfonate esters, t-butyl esters, allyl substituted phenols, t-butyl carbonates, sulfate esters, phosphate esters and phosphonate esters.

Preferred colour developing agent precursors are the thermal acid generating compounds have a structure according to Formula (I) or Formula (II):

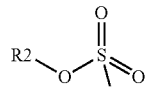

Formula I

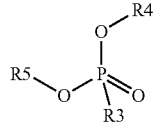

Formula II wherein
R1 and R3 independently represent an optionally substituted alkyl group, an optionally substituted (hetero)cyclic alkyl group, an optionally substituted alkanyl group, an optionally substituted alkenyl group, an optionally substituted alkynyl group, an optionally substituted (hetero)aryl group, an optionally substituted aralkyl group, an optionally substituted alkoxy group, an optionally substituted (hetero)cyclic alkoxy group, or an optionally substituted (hetero)aryl group.
R2, R4 and R5 independently represent an optionally substituted alkyl, an optionally substituted aliphatic (hetero) cyclic alkyl group or an optionally substituted aralkyl group;
R1 and R2, R4 and R5, R3 and R4, and R3 and R5 may represent the necessary atoms to form a ring.

Suitable alkyl groups include 1 or more carbon atoms such as for example $C_1$ to $C_{22}$-alkyl groups, more preferably $C_1$ to $C_{12}$-alkyl groups and most preferably $C_1$ to $C_6$-alkyl groups. The alkyl group may be lineair or branched such as for example methyl, ethyl, propyl (n-propyl, isopropyl), butyl (n-butyl, isobutyl, t-butyl), pentyl, 1,1-dimethyl-propyl, 2,2-dimethylpropyl and 2-methyl-butyl, or hexyl.

Suitable cyclic alkyl groups include cyclopentyl, cyclohexyl or adamantyl.

Suitable heterocyclic alkyl groups include tetrahydrofuryl, piperidinyl, pyrrolidinyl, dioxyl, tetrahydrothiophenyl, silolanyl, or thianyl oxanyl.

Suitable aryl groups include for example phenyl, naphthyl, benzyl, tolyl, ortho-meta- or para-xylyl, anthracenyl or phenanthrenyl.

Suitable heteroaryl groups include monocyclic- or polycyclic aromatic rings comprising carbon atoms and one or more heteroatoms in the ring structure. Preferably 1 to 4 heteroatoms independently selected from nitrogen, oxygen, selenium and sulphur and/or combinations thereof. Examples include pyridyl, pyrimidyl, pyrazoyl, triazinyl, imidazolyl, (1,2,3,)- and (1,2,4)-triazolyl, tetrazolyl, furyl, thienyl, isoxazolyl, thiazolyl and carbazoyl.

Suitable alkoxy groups include those containing from 1 to 18, preferably 2 to 8 carbon atoms, such as ethoxide, propoxide, isopropoxide, butoxide, isobutoxide and tert-butoxide.

Suitable aryloxy groups include phenoxy and naphthoxy.

The alkyl, (hetero)cyclic alkyl, aralkyl, (hetero)aryl, alkoxy, (hetero)cyclic alkoxy, or (hetero)aryloxy groups may include one or more substituents. The optional substituents are preferably selected from an alkyl group such as a methyl, ethyl, n-propyl, isopropyl, n-butyl, 1-isobutyl, 2-isobutyl and tertiary-butyl group; an ester, amide, ether, thioether, ketone, aldehyde, sulfoxide, sulfone, sulfonate ester or sulfonamide group, a halogen such as fluorine, chlorine, bromine or iodine, —OH, —SH, —CN and —NO$_2$, and/or combinations thereof.

R1 preferably represents a $C_1$ to $C_{22}$-alkyl group, an aliphatic alkoxide group containing 2 to 8 carbons, a phenyl group or a tolyl group. R1 most preferably represents a tolyl group.

R2 preferably represents a $C_1$ to $C_{22}$-alkyl group or a (hetero)cyclic alkyl group. R2 most preferably represents a cyclohexyl group.

R3 preferably represents a $C_1$ to $C_{22}$-alkyl group, an aliphatic alkoxide group containing 2 to 8 carbons or a benzyl group.

In a preferred embodiment, R4 and R5 independently represent a $C_1$ to $C_{22}$-alkyl group. In a preferred embodiment, R4 and R5 represent independently an isobutyl, t-butyl, isopropyl, 2-ethylhexyl or a linear $C_2$ to $C_8$-alkyl group.

The compound used in a preferred embodiment of the present invention can be a monomer, an oligomer (i.e. a structure including a limited amount of monomers such as two, three or four repeating units) or a polymer (i.e. a structure including more than four repeating units).

The compound used in a preferred embodiment of the present invention contains at least one moiety according to Formula I and/or Formula II, preferably 1 to 150 moieties according to Formula I and/or Formula II. According to a preferred embodiment, the compound according to Formula I or Formula II may be present in a side chain of a polymer In the embodiment wherein the compound according to Formula I or Formula II is present in the side chain of a polymer, the following moiety (Formula III, IV or V) is preferably attached to the polymer:

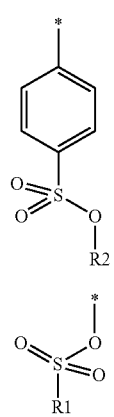

Formula III

Formula IV

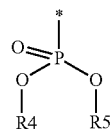

Formula V wherein
* denotes the linking to the polymer and
R1, R2, R4 and R5 as described above.

In the embodiment wherein the compound according to Formula I is present in the side chain of a polymer, the polymer is more preferably obtained from the coupling of a polymer or copolymer bearing side chains with alcohol groups and a sulfonyl chloride.

In the embodiment wherein the compound according to Formula I is present in the side chain of a polymer, the polymer is most preferably obtained from the coupling of a polymer or copolymer bearing side chains with alcohol groups and tosyl chloride. Useful polymers bearing side chains with alcohol include for example polyvinyl alcohol, polyvinyl butyral, cellulose derivatives, homo- and copolymers of 2-hydroxyethyl methacrylate, 2-hydroxyethyl acrylate, polysiloxane derivatives such as copolymers of hydroxyalkyl-methylsiloxane, and novolac resins.

Examples of acid generating compounds according to the present invention are shown in Table 1.

TABLE 1

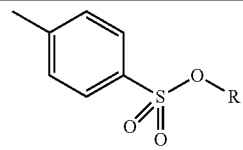

wherein R represents an alkyl group, preferably a tertiary butyl group.

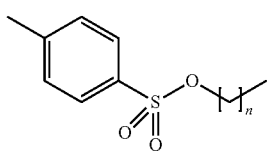

with n = 1-50

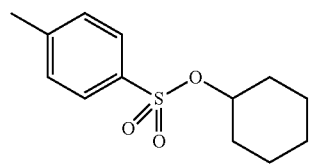 [SMILES: Cc1ccc(S(=O)(=O)OC2CCCCC2)cc1]

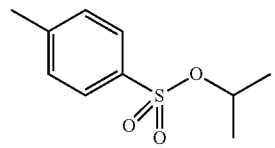

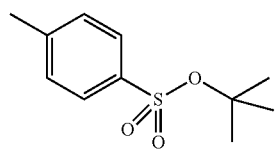

TABLE 1-continued
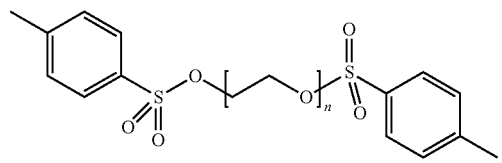
with n = 1-10000
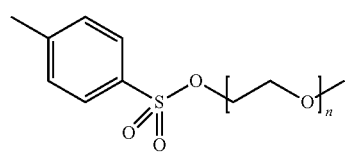
with n = 1-10000
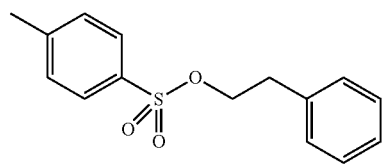 [SMILES: Cc1ccc(S(=O)(=O)OCCc2ccccc2)cc1]
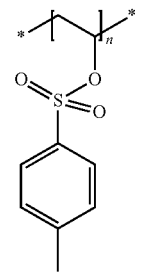
with n = 1-10000 and copolymers thereof
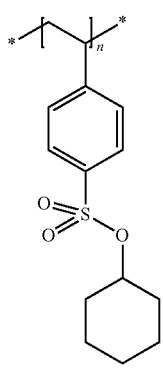
with n = 1-10000 and copolymers thereof
TABLE 1-continued
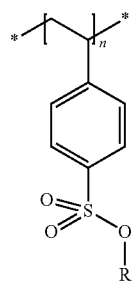
with n = 1-10000 and copolymers thereof and R represents an alkyl group, preferably a tertiary butyl group
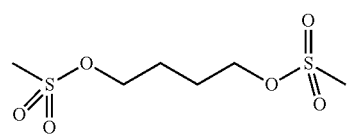
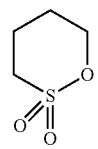
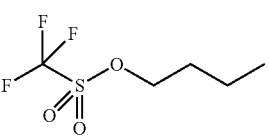
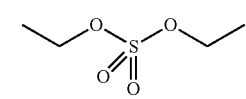
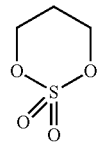
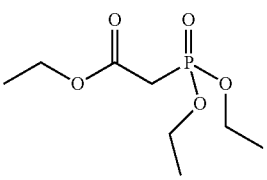
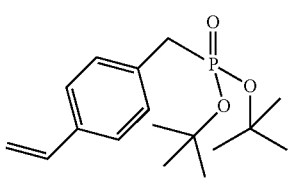 [SMILES: C=Cc1ccc(CP(=O)(OC(C)(C)C)OC(C)(C)C)cc1]

TABLE 1-continued

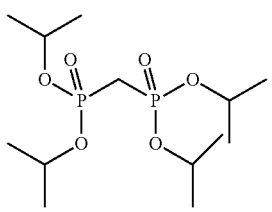 [SMILES: CC(C)OP(=O)(CP(=O)(OC(C)C)OC(C)C)OC(C)C]
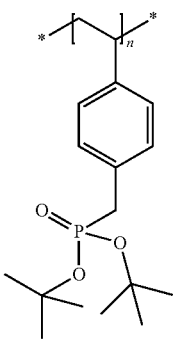

with n = 1-10000 and copolymers thereof

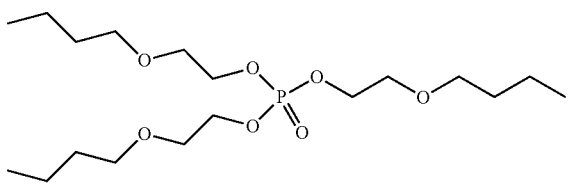 [SMILES: CCCCOCCOP(=O)(OCCOCCCC)OCCOCCCC]
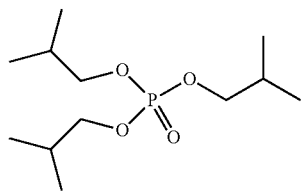 [SMILES: CC(C)COP(=O)(OCC(C)C)OCC(C)C]
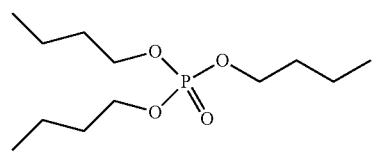 [SMILES: CCCCOP(=O)(OCCCC)OCCCC]
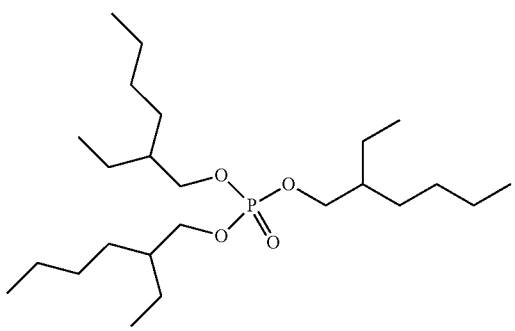 [SMILES: CCCCC(CC)COP(=O)(OCC(CC)CCCC)OCC(CC)CCCC]

TABLE 1-continued

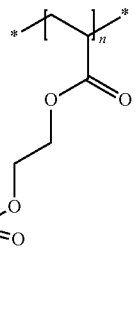

with n = 1-10000 and copolymers thereof

Other classes of photo- and thermal acid generators are iodonium salts, sulfonium salts, ferrocenium salts, sulfonyl oximes, halomethyl triazines, halomethyl-arylsulfone, α-haloacetophenones, sulfonate esters, t-butyl esters, allyl substituted phenols, t-butyl carbonates, sulfate esters, phosphate esters and phosphonate esters.

According to preferred embodiment of the invention, the colour developing agent precursor is a polymer particle, which is capable of forming an acid upon exposure to heat.

The acid liberated upon exposure to heat within the meaning of the invention includes Arrhenius acids, Brønsted-Lowry acids, and Lewis acids.

The polymer particles, which are capable of forming an acid upon exposure to heat may have two functions:
a colour developing agent precursor, which liberates an acid upon exposure to heat, and
film forming binder.

The polymer particles comprise repeating units, which are capable of generating an acid upon exposure to heat. Typically, exposure to heat may cause a fragmentation reaction resulting in an acid formation. The resulting acid may be a low molecular weight molecule formed by the fragmentation reaction or the acid may reside on the polymer particle after a fragmentation reaction. Table 2 depicts (part of) polymeric acid precursors, more specific the repeating unit that is able to generate an acid upon thermal treatment.

TABLE 2

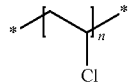
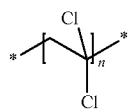
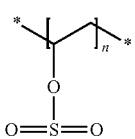

TABLE 2-continued

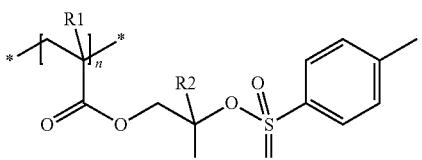

wherein R1, R2 and R3 independently represent hydrogen or alkyl groups

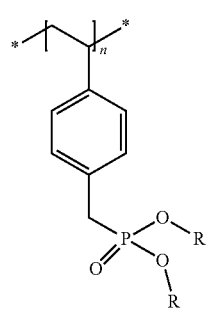

wherein R represents an alkyl group, preferably a tertiary butyl group

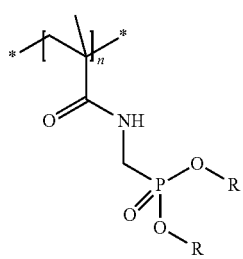

wherein R represents an alkyl group, preferably a tertiary butyl group

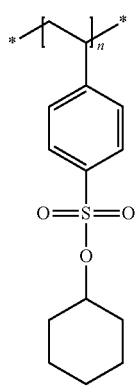

TABLE 2-continued

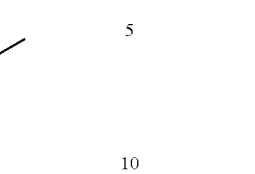

wherein R represents an alkyl group, preferably a tertiary butyl group

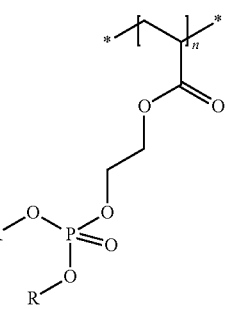

wherein R represents an alkyl group, preferably a tertiary butyl group

According to a preferred embodiment of the invention, the polymeric particles are capable of releasing a low molecular weight acid.

A particularly preferred polymer particle is a polyvinylidenechloride (PVDC) polymer particle. Upon exposure to heat, such a polymer particle is capable of releasing HCl.

The polyvinylidenechloride (PVDC) particle is preferably a vinylidene chloride copolymer comprising 90 wt % or less of vinylidene chloride based on the total weight of the binder.

When the amount of vinylidene chloride is above 90 wt % based on the total weight of the binder, the crystallinity of the binder becomes too high resulting in poor film forming property. Copolymerizaton of vinylidene chloride with further monomers renders the copolymer more amorphous and thus more soluble in the liquid carrier.

The vinylidene chloride copolymer preferably comprises a further monomer selected from the group consisting of vinyl chloride, alkyl acrylate, alkyl methacrylate, vinylether, vinylacetate, vinyl alcohol, acrylonitrile, methacrylonitrile, maleic acid, maleic anhydride, itaconic acid.

The vinylidene chloride copolymer more preferably comprises a further monomer selected from the group consisting of vinyl chloride, acrylonitrile, maleci acid, maleic anhydride and an alkyl acrylate.

The alkyl acrylate and alkyl methacrylate referred to above is preferably a C1-C10 alkyl acrylate or methacrylate. Particular preferred alkyl acrylates or alkyl methacrylates are methyl and butyl acrylate or methyl and butyl methacrylate.

Water based vinylidene copolymers may also be used in the present invention. Examples of such copolymers are Daran® 8730, Daran®8550, Daran®SL112, Daran®SL143, Daran®SL159 or Daran®8100, all commercially available from Owensboro Specialty Polymers; Diofan®193D, Diofan®P520, Diofan®P530 all commercially available from Solvay.

A PVDC copolymer may be characterized by the so-called dehydrochlorination constant (DHC). The amount of HCl liberated by a specific PVDC copolymer at a specified temperature during a specific time is measured.

The amount of polymer particle in the laser markable composition is preferably between 5 and 75 wt %, more preferably between 7.5 and 50 wt %, most preferably between 10 and 40 wt %, relative to the total weight of the laser markable composition. After applying and drying the composition on a support, the amount of polymer particles is preferably between 50 and 95 wt %, more preferably between 65 and 90 wt %, most preferably between 75 and 85 wt %, relative to the total dry weight of the laser markable composition.

Leuco Dyes

All publicly-known leuco dyes can be used and are not restricted. They are for example widely used in conventional pressure-sensitive, photosensitive or thermally-sensitive recording materials. For more information about leuco dyes, see for example Chemistry and Applications of Leuco Dyes, Ramaiah Muthyala, Plenum Press, 1997.

A number of classes of leuco dyes may be used as colour forming compounds in the present invention, such as for example: spiropyran leuco dyes such as spirobenzopyrans (e.g. spiroindolinobenzopyrans, spirobenzo-pyranobenzo-pyrans, 2,2-dialkylchromenes), spironaphtooxazine and spirothiopyran; leuco quinone dyes; azines such as oxazines, diazines, thiazines and phenazine; phthalide- and phthalimidine-type leuco dyes such as triarylmethane phtalides (e.g. crystal violet lactone), diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; fluoran leuco dyes such as fluoresceins, rhodamines and rhodols; triarylmethanes such as leuco crystal violet; ketazines; barbituric acid leuco dyes and thiobarbituric acid leuco dyes.

The capsules may comprise more than one leuco dye, typically to obtain a specific desired colour.

The leuco dye is preferably present in the laser markable layer in an amount of 0.05 to 5.00 g/m$^2$, more preferably in an amount of 0.10 to 3.00 g/m$^2$, most preferably in an amount of 0.20 to 1.00 g/m$^2$.

The following reaction mechanisms and leuco dyes are suitable to form a coloured dye.

1. Protonation of a Leuco Dye After Fragmentation of an Acid Generator

The reaction mechanism can be represented by:

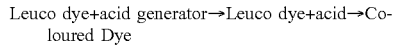

Preferred leuco dyes are phthalide- and phthalimidine-type leuco dyes such as triarylmethane phthalides, diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; and fluoran leuco dyes such as fluoresceins, rhodamines and rhodols.

In a more preferred embodiment of the present invention, a combination is used of at least one compound selected from the group consisting of CASRN 50292-95-0, CASRN 89331-94-2, CASRN1552-42-7 (crystal violet lactone), CASRN148716-90-9, CASRN 630-88-6, CASRN 36889-76-7 or CASRN 132467-74-4 as the Leuco Dye and at least one compound selected from the group consisting of CASRN 58109-40-3, CASRN 300374-81-6, CASRN 1224635-68-0, CASRN 949-42-8, CASRN 69432-40-2, CASRN 3584-23-4, CASRN 74227-35-3, CASRN 953-91-3 or CASRN6542-67-2 as acid generator.

2. Oxidation of a Triarylmethane Leuco Dye

The reaction mechanism can be represented by:

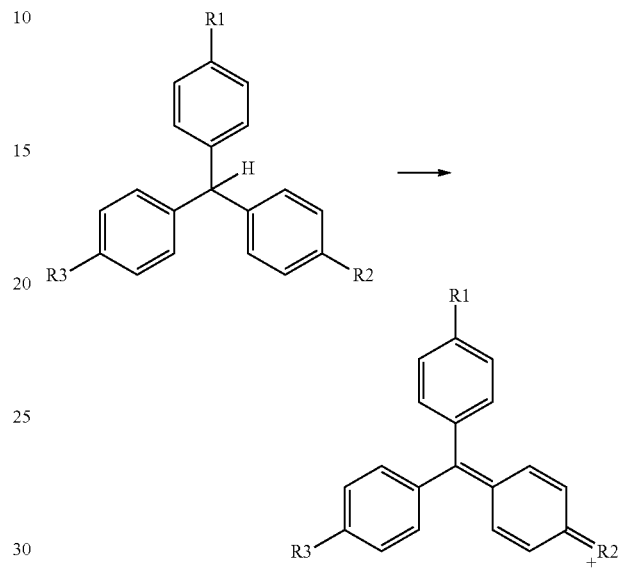

wherein R1, R2 and R3 each independently represent an amino group, an optionally substituted mono- or dialkylamino group, a hydroxyl group or an alkoxy group. R1 and R3 also each independently represent a hydrogen atom or an optionally substituted alkyl, aryl, or heteroaryl group. A preferred leuco dye for the present invention is leuco crystal violet (CASRN 603-48-5).

3. Oxidation of a Deuco Quinone Dye

The reaction mechanism can be represented by

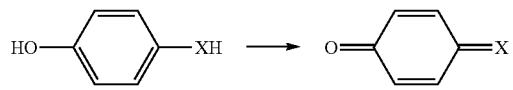

wherein X represents an oxygen atom or an optionally substituted amino or methine group.

4. Fragmentation of a Leuco Dye

The reaction mechanism can be represented by:

wherein FG represents a fragmenting group.

Preferred leuco dyes are oxazines, diazines, thiazines and phenazine. A particularly preferred leuco dye (CASRN104434-37-9) is shown in EP 174054 (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye may be catalyzed or amplified by acids, photo acid generators, and thermal acid generators.

5. Ring Opening of Spiropyran Leuco Dyes

The reaction mechanism can be represented by:

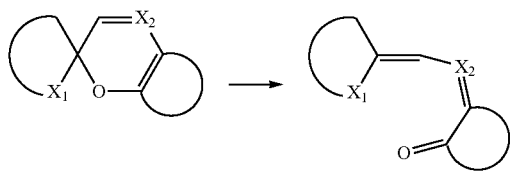

wherein $X_1$ represents an oxygen atom, an amino group, a sulfur atom or a selenium atom and $X_2$ represents an optionally substituted methine group or a nitrogen atom.

The preferred spiropyran leuco dyes for the present invention are spiro-benzopyrans such as spiroindolinobenzopyrans, spirobenzopyranobenzopyrans, 2,2-dialkylchromenes; spironaphtooxazines and spirothiopyrans. In a particularly preferred embodiment, the spiropyran leuco dyes are CASRN 160451-52-5 or CASRN 393803-36-6. The ring opening of a spiropyran leuco dye may be catalyzed or amplified by acids, photo acid generators, and thermal acid generators.

In a preferred embodiment of a laser markable layer for producing a cyan colour, the cyan colour forming compound has a structure according to Formulae CCFC1, CCFC2 or CCFC3.

CCFC1

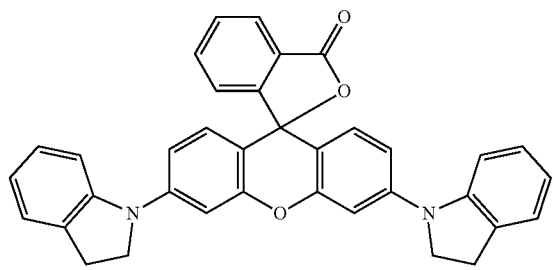

CCFC2

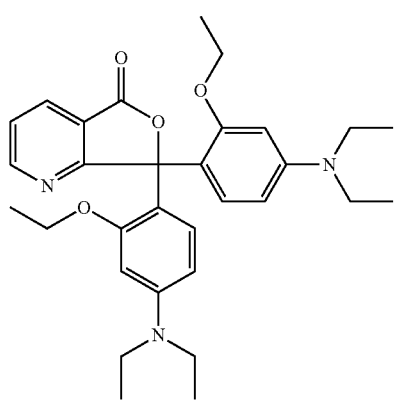

CCFC3

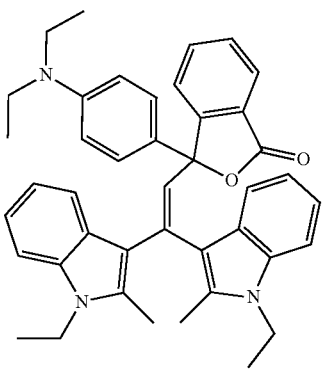

In a preferred embodiment of a laser markable layer for producing a magenta colour, the magenta colour forming compound has a structure according to Formula MCFC2:

MCFC2

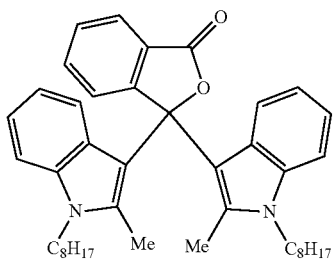

In a preferred embodiment of a laser markable layer for producing a red colour, the red colour forming compound has a structure according to Formula RCFC:

RCFC

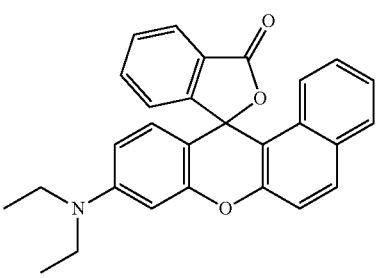

In a preferred embodiment of a laser markable layer for producing a yellow colour, the yellow colour forming compound has a structure according to Formula YCFC:

YCFC

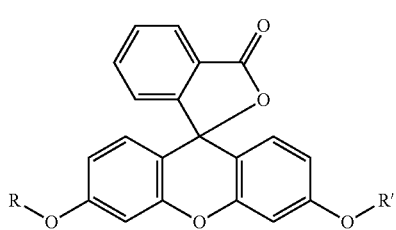

wherein R, R' are independently selected from a group consisting of a linear alkyl group, a branched alkyl group, an aryl and aralkyl group.

In one embodiment, the yellow colour forming compound has a structure according to Formula YCFC, wherein R and R' independently represent a linear alkyl group, a branched alkyl group, an aryl or an aralkyl group substituted by at least one functional group containing an oxygen atom, a sulfur atom or a nitrogen atom.

A particularly preferred yellow colour forming compound is the compound according to Formula YCFC wherein both R and R' are methyl.

In a most preferred embodiment of a laser markable layer for producing a yellow colour, the yellow colour forming compound has a structure according to Formulae YCFC1 or YCFC2.

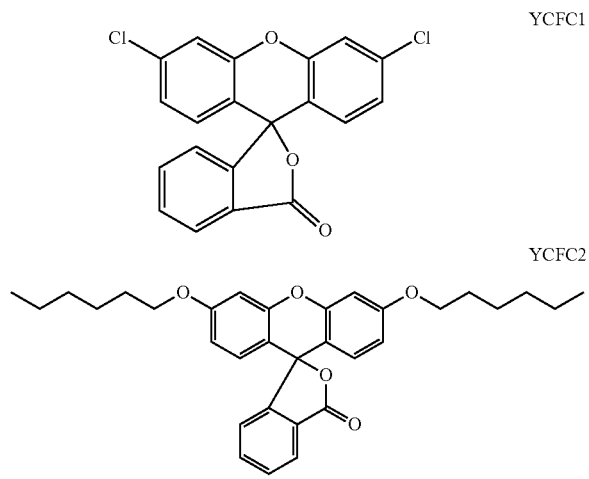

YCFC1

YCFC2

In a preferred embodiment of a laser markable layer for producing a black colour, the black colour forming compound has a structure according to Formula BCFC

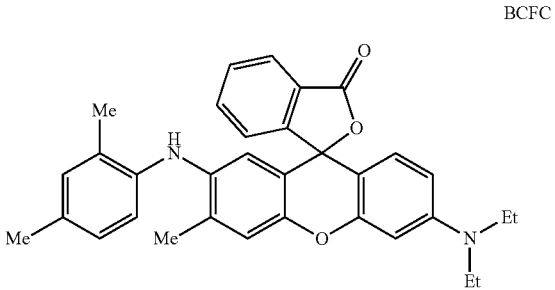 [SMILES: CCN(CC)c1ccc2c(c1)Oc1cc(C)c(Nc3ccc(C)cc3C)cc1C21OC(=O)c2ccccc21]

BCFC wherein Me=methyl and Et=Ethyl.

Polymeric Binder

The laser markable composition may include a polymeric binder. In principle any suitable polymeric binder that does not prevent the colour formation in a laser markable layer may be used. The polymeric binder may be a polymer, a copolymer or a combination thereof.

The laser markable layer preferably includes a water soluble or dispersible binder.

Examples of water soluble or dispersible binder are homopolymers and copolymers of vinyl alcohol, (meth) acrylamide, methylol (meth)acrylamide, (meth)acrylic acid, hydroxyethyl (meth) acrylate, maleic anhydride/vinylmethylether copolymers, copolymers of (meth)acrylic acid or vinylalcohol with styrene sulphonic acid, vinyl alcohol/vinylacetate copolymers, carboxy-modified polyvinyl alcohol, carboxymethyl cellulose, hydroxyethyl cellulose, cellulose sulfate, polyethylene oxides, gelatin, cationic starch, casein, sodium polyacrylate, styrene-maleic anhydride copolymer sodium salt, sodium polystyrene sulfonate.

Preferred vinyl alcohol-vinyl acetate copolymers are disclosed in EP-A 2103736, paragraph [79]-[82].

Other preferred water soluble or dispersible binders are the copolymers comprising alkylene and vinyl alcohol units disclosed in EP-A 2457737 paragraph [0013] to [0023] such as the Exceval™ type polymers from Kuraray.

The polymeric binder is preferably present in the colour forming layer in an amount of 1 to 30 $g/m^2$, more preferably in an amount of 2 to 20 $g/m^2$, most preferably in an amount of 3 to 10 $g/m^2$.

Acid Scavenger

The laser markable layer or another layer of the laser markable article may contain one or more acid scavengers.

Acid scavengers include organic or inorganic bases. Examples of the inorganic bases include hydroxides of alkali metals or alkaline earth metals; secondary or tertiary phosphates, borates, carbonates; quinolinates and metaborates of alkali metals or alkaline earth metals; a combination of zinc hydroxide or zinc oxide and a chelating agent (e.g., sodium picolinate); hydrotalcite such as Hycite 713 from Clariant; ammonium hydroxide; hydroxides of quaternary alkylammoniums; and hydroxides of other metals. Examples of the organic bases include aliphatic amines (e.g., trialkylamines, hydroxylamines and aliphatic polyamines); aromatic amines (e.g., N-alkyl-substituted aromatic amines, N-hydroxylalkyl-substituted aromatic amines and bis[p-(dialkylamino) phenyl]-methanes), heterocyclic amines, amidines, cyclic amidines, guanidines and cyclic guanidines.

Other preferred acid scavengers are HALS compounds. Example of suitable HALS include Tinuvin™ 292, Tinuvin™ 123, Tinuvin™ 1198, Tinuvin™ 1198 L, Tinuvin™ 144, Tinuvin™ 152, Tinuvin™ 292, Tinuvin™ 292 HP, Tinuvin™ 5100, Tinuvin™ 622 SF, Tinuvin™ 770 DF, Chimassorb™ 2020 FDL, Chimassorb™ 944 LD from BASF; Hostavin 3051, Hostavin 3050, Hostavin N 30, Hostavin N321, Hostavin N 845 PP, Hostavin PR 31 from Clariant.

Further examples of acid scavengers are salts of weak organic acids such as carboxylates (e.g. calcium stearate).

A preferred acid scavenger is an organic base, more preferably an amine. A particular preferred acid scavenger is an organic base having a pKb of less than 7.

UV Absorbers

The laser markable article may also comprise a UV-absorber. The UV-absorber may be present in a laser markable layer or may also be present in another layer, for example an outer layer or an intermediate layer.

Examples of suitable UV-absorbers include 2-hydroxyphenyl-benzophenones (BP) such as Chimassorb™ 81 and Chimassorb™ 90 from BASF; 2-(2-hydroxyphenyl)-benzotriazoles (BTZ) such as Tinuvin™ 109, Tinuvin™ 1130, Tinuvin™ 171, Tinuvin™ 326, Tinuvin™ 328, Tinuvin™ 384-2, Tinuvin™ 99-2, Tinuvin™ 900, Tinuvin™ 928, Tinuvin™ Carboprotect™, Tinuvin™ 360, Tinuvin™ 1130, Tinuvin™ 327, Tinuvin™ 350, Tinuvin™ 234 from BASF, Mixxim™ BB/100 from FAIRMOUNT, Chiguard 5530 from Chitec; 2-hydroxy-phenyl-s-triazines (HPT) such as Tinuvin™ 460, Tinuvin™ 400, Tinuvin™ 405, Tinuvin™ 477, Tinuvin™ 479, Tinuvin™ 1577 ED, Tinuvin™ 1600 from BASF, 2-(2,4-dihydroxyphenyl)-4,6-bis-(2,4-dimethylphenyl)-s-triazine (CASRN1668-53-7) from Capot Chemical Ltd and 4-[4,6-bis(2-methyl-phenoxy)-1,3,5-triazin-2-yl]-1,3-benzenediol (CASRN13413-61-1); titanium dioxide such as Solasorb 100F from from Croda Chemicals; zink oxide such as Solasorb 200F from Croda Chemicals; benzoxazines such as Cyasorb UV-3638 F, CYASORB™ UV-1164 from CYTEC; and oxamides such as Sanduvor VSU from Clariant.

Preferred UV absorbers have in the wavelength region between 300 and 400 nm a maximum absorption above 330 nm, more preferably above 350 nm.

Particular preferred UV absorbers are hydroxyphenyl benzotriazoles and 2-hydroxyphenyl-s-triazines having a maximum absorption above 350 nm in the wavelength region 300-400 nm.

Laser Markable Article

The laser markable article according to a preferred embodiment of the present invention is prepared by applying the laser markable composition on a support thereby forming a laser markable layer onto the support.

The laser markable composition may be provided onto a support by co-extrusion or any conventional coating technique, such as dip coating, knife coating, extrusion coating, spin coating, spray coating, slide hopper coating and curtain coating. Preferably the laser markable layer is coated with a slide hopper coater or a curtain coater.

The laser markable composition may also be provided onto a support by inkjet printing. Using inkjet printing is preferred when only a part or several parts of a support has to be provided with a laser markable layer.

Applying the laser markable composition according to the present invention on a support results in a colour laser markable article comprising a laser markable layer comprising capsules composed of a polymeric shell surrounding a core, a colour developing agent, and an optothermal converting agent, wherein the core of the capsule contains a leuco dye.

The dry thickness of the laser markable layer is preferably between 1 and 50 g/m², more preferably between 2 and 25 g/m², and most preferably between 3 and 15 g/m².

A laser markable layer according to the present invention may be combined with other laser markable layers.

Such other laser markable layers may be another laser markable layer according to the present invention, with for example a different infrared absorbing dye and a different leuco dye, and may be used to produce multiple colours by multiple laser exposures, as disclosed in for example EP-A 2719540 and EP-A 2719541.

Such other laser markable layers may also be any known laser markable layer and may be used to produce another colour in addition to the colour formed in the laser markable layer according to the present invention.

Such other laser markable layer may also be a layer which may undergo carbonization upon exposure to infrared radiation and is therefore capable of forming a black colour. Such laser markable layers are well known in the art and are for example disclosed in EP-A 2567825 paragraph [0111] to [0123].

EP-A 2567825 also discloses a laser markable polymeric support (paragraphs [0109]-[0110]), which may also be used in combination with the laser markable composition according to the present invention.

When multiple laser markable layers are present, it may be advantageous to provide an intermediate layer between the laser markable layers to prevent colour contamination.

To further improve the daylight and/or weather resistance of the laser markable article, it may be advantageous to provide a top coat on the laser markable layer wherein the top coat may contain one or more UV absorbing compounds or one or more light stabilizing compounds, such as for example HALS compounds. It may also be advantageous to incorporate water barrier properties into the laser markable article to improve the stability of the laser marked image in high humid conditions.

Support

The laser markable composition is applied on a support to prepare a colour laser markable article. The composition may be applied on any surface, for example a metallic support, a glass support, a paper support.

For security documents, a preferred support is a polymeric support, more preferably a transparent polymeric support, most preferably a transparent axially stretched polyester support.

Suitable transparent polymeric supports include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulfonamides.

In the most preferred embodiment, the transparent polymeric support is a biaxially stretched polyethylene terephthalate foil (PET-C foil) to be very durable and resistant to scratches and chemical substances.

The support preferably is a single component extrudate, but may also be a co-extrudate. Examples of suitable co-extrudates are PET/PETG and PET/PC.

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate and biaxially oriented films thereof have been disclosed in, e.g. US2008/238086.

Subbing Layers

The polymeric support may be provided with one or more subbing layers to improve the adhesion between the laser markable layer and the support.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

Suitable vinylidene chloride copolymers include: the copolymer of vinylidene chloride, N-tert.-butylacrylamide, n-butyl acrylate, and N-vinyl pyrrolidone (e.g.70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g.90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the transparent oriented polyester support is provided with a subbing layer including a binder based on a polyester-urethane copolymer.

In a more preferred embodiment, the polyester-urethane copolymer is an ionomer type polyester urethane, preferably using polyester segments based on terephthalic acid and ethylene glycol and hexamethylene diisocyanate.

A suitable polyester-urethane copolymer is Hydran™ APX101 H from DIC Europe GmbH.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AGFA);

In a preferred embodiment, the subbing layer has a dry thickness of no more than 0.2 µm or preferably no more than 200 mg/m².

Additional Layers

The laser markable article may in addition to the laser markable layer according to the present invention contain additional layers, such as for example other laser markable layers, subbing layers, an outer layer that is suitable as a receiver layer for dyes applied by thermal dye sublimation or even inkjet printing, or intermediate layers between laser markable layers. An outer layer as used herein means an outermost layer, or foil.

The laser markable material preferably comprises an intermediate layer between the laser markable layers to prevent colour contamination. Such an intermediate layer may be a polymeric film such as disclosed in EP-A 2719541 but is preferably a coated layer, preferably a layer coated from an aqueous coating solution.

These intermediate layers preferably contain an acid scavenger as disclosed above to prevent diffusion of an acid from one laser markable layer to another.

Intermediate layers, or more preferably an outer layer, may contain a UV absorber as disclosed above to improve the daylight stability of the laser markable materials.

To further improve the daylight and/or weather resistance of the laser markable article, it may be advantageous to provide a top coat on the laser markable layer wherein the top coat may contain one or more UV absorbing compounds or one or more light stabilizing compounds, such as for example HALS compounds.

It may also be advantageous to incorporate water barrier properties into the laser markable article to improve the stability of the laser marked image in high humid conditions, for example by incorporating one or more intermediate and/or top layers having such water barrier properties.

Core Supports

A colour laser markable document precursor or document may be prepared by applying, preferably laminating, a colour laser markable article as described above on a core support. The core support may be transparent or opaque. The core support is preferably an opaque white core support. The advantage of an opaque white core support is that any information present on the document is more easily readable and that a colour image is more appealing by having a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In a preferred embodiment of the present invention the rutile type is preferred because it has a very high refractive index, exhibiting a high covering power.

In a particular preferred colour laser markable document precursor or document, the laser markable article is applied on both sides of a core support.

Laser Marking Methods

A method of preparing a colour laser marked article according to a preferred embodiment of the present invention comprises the steps of:

providing a colour laser markable composition as described above on a support; and colour laser marking the article using an infrared laser.

The infrared laser may be a continuous wave or a pulsed laser.

A preferred continuous wave laser is a semiconductor laser because the device is compact and inexpensive. Most semiconductor lasers are laser diodes, which are pumped with an electrical current in a region where n-doped and p-doped semiconductor material meet. However, there are also optically pumped semiconductor lasers, where carriers are generated by absorbed pump light. Optically pumped semiconductor lasers have the advantage of unique wavelength flexibility, different from any other solid-state based laser. The fundamental near-IR output wavelength is determined by the structure of the gain chip (e.g. the semiconductor InGaAs), and can be set anywhere between about 920 nm and about 1150 nm. This allows a perfect match between the laser emission wavelength and the infrared dye absorption maximum.

A preferred pulsed laser is a solid state Q-switched laser. Q-switching is a technique by which a laser can be made to produce a pulsed output beam. The technique allows the production of light pulses with extremely high peak power, much higher than would be produced by the same laser if it were operating in a continuous wave (constant output) mode, Q-switching leads to much lower pulse repetition rates, much higher pulse energies, and much longer pulse durations.

Other Security Features

The laser markable article is preferably combined with one or more other security features to increase the difficulty for falsifying the document.

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

Suitable other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

EXAMPLES

Materials

All materials used in the following examples were readily available from standard sources such as ALDRICH CHEMICAL Co. (Belgium) and ACROS (Belgium) unless otherwise specified. The water used was deionized water.

Takenate D120N is a urethane resin commercially available from Mitsui.

Mowiol 4 88 is a polyvinyl alcohol commercially available from Hoechst.

Olfine E1010 is a wetting agent commercially available from Shin-Etsu Chemical Company.

Arlo is a 15 wt % aqueous solution of Marlon A365, commercially available from Brenntag.

Proxel Ultra 5 is a biocide, commercially available from Avecia.

Ralox 46 is a sterically hindered phenolix antioxidant from Raschig.

Tinuvin 928 is a UV absorber commercially available from BASF.

DISFLAMOLL TKP is a low volatility halogen free phosphate plasticer from Lanxess.

Proxelk is a 5 wt % aqueous solution of 1,2-benzisothiazoline-3-one potassium salt (CASRN 127553-58-6, commercially available from Prom Chem).

MOW is an aqueous solution of 15 wt % Mowiol 4 88 and 2 wt % Proxelk.

CCE is Hydran APX-101H, a polyester urethane (45%) from DIC.

Resorcinol is commercially available from Sumitomo Chemicals.

Par is a dimethyltrimethylamine formaldehyde resin from Cytec industries.

PAR-sol is a 40 wt % aqueous solution of Par.

PEA is Tospearl™ 120 from Momentive Performance Materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in isopropanol.

CORE is a 500 μm opaque PETG core available as PET-G 500 type 9311 from WOLFEN.

LD-01 is MITSUI GN-169, a leuco dye (CASRN148716-90-9) commercially available from Mitsui.

LD-02 is MITSUI GN-2, a leuco dye (CASRN 132467-74-4) commercially available from Mitsui.

LD-03 is WINCON 205, a leuco dye (CASRN 70516-41-5) commercially available from Connect Chemicals.

LD-04 is Pergascript Black 2C, a leuco dye (CASRN 89331-94-2) commercially available from BASF.

LD-05 is Pergascript black IR, a leuco dye commercially available from CIBA-GEIGY.

LD-06 is a leuco dye (CASRN21934-68-9) commercially available from Molekula Fine Chemicals.

LD-07 is Wincon Red, a leucodye (CASRN 50292-95-0) commercially available from Connect Chemicals.

Tinuvin 928 is an UV absorber, commercially available from BASF.

Tetraethylenepentamine (CASRN112-57-2) commercially available from Aldrich.

4,4'-Thiobis(6-tert-butyl-m-cresol commercially available from TCI Europe.

Ralox 46 commercially available from Raschig.

DISFLAMOLL TKP commercially available from Lanxess.

Ethyl Maleate commercially available from TCI Europe.

Zinc 3,5-bis(alpha methylbenzyl) salicylate (CASRN53770-52-8), a colour developing agent commercially available from Sanko Europe.

Aerosol OT-100 is a surfactant commercially available from CYTEC.

Cyclohexyl p-toluene sulfonate, a colour developing agent commercially available from TCI, further purified by extraction and recrystallization—meer info nodig?)

CB-01, is Cab-O-Jet 300, a carbon black dispersion from CABOT CORPORATION, 300 times diluted.

DARAN 8100, is a vinylidene copolymer-methyl acrylate polymer dispersion in water (60 wt %), commercially available from OWENSBORO SPECIALTY POLYMERS.

Tinogard AS, a UV absorber commercially available from BASF.

DR306 is a surfactant solution according to the following table.

| g of component | DR306 |
|---|---|
| Chemguard ™ S228 | 52.6 |
| Chemguard ™ S550 | 52.6 |
| Isopropanol | 473.0 |
| water | 431.0 |

Chemguard™ S228 is a blend of fluoro/silicone surfactants from CHEMGUARD INC.

Chemguard™ S550 is a short-chain perfluoro-based ethoxylated nonionic fluorosurfactant from CHEMGUARD INC.

Buffer (pH 9) is a phosphate buffer (0.25 M NaH2PO4).

1064IR is an IR dye with the following formula and synthesized as disclosed in paragraphs [0150] to [0159] of EP-A 2463109.

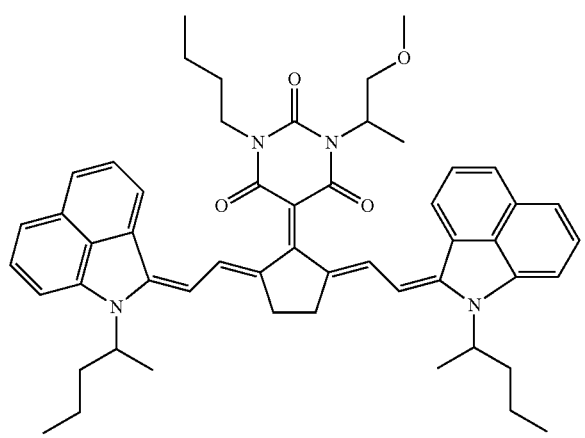 [SMILES: CCCCN1C(=O)/C(=C2C(=C\C=c3/c4cccc5cccc(c54)n3C(C)CCC)/CCC/2=C\C=c2/c3cccc4cccc(c43)n2C(C)CCC)C(=O)N(C(C)COC)C1=O]

Example 1

Preparation of the Leuco Dye Dispersion LD-DISP-01

100 g LD-04, 200 g of a 5 wt % solution of Aerosol OT-100 in water and 2 g of a 5 wt % solution of 1,2-benzisothiazol-3(2H)-one, potassium salt in water were mixed into 198 g water using a DISPERLUX™ dispenser. Stirring was continued for 30 minutes. The vessel was connected to a NETZSCH MiniZeta mill filled with 900 g of 0.4 mm yttrium stabilized zirconia beads ("high wear resistant zirconia grinding media" from TOSOH Co.). The mixture was circulated over the mill for 67 minutes (residence time of 20 minutes) and a rotation speed in the mill of about 10.4 m/s. During the complete milling procedure the content in the mill was cooled to keep the temperature below 60° C. After milling, the dispersion was discharged into a vessel. The resulting concentrated dispersion exhibited an average particle size of 193 nm as measured with a Malvern™ nano-S and a viscosity of 5 mPa·s at 25° C. and at a shear rate of 10 s$^{-1}$.

Preparation of the Leuco Dye Dispersion LD-DISP-02

10 g LD-07, 20 g of a 5 wt % solution of Aerosol OT-100 in water, 0.375 g of a 8 wt % solution of sodium hydroxide in water and 0.2 g of a 5 wt % solution of 1,2-benzisothiazol-3(2H)-one, potassium salt in water were mixed into 19.425 g water and introduced into a 100 mL plastic container. The container was filed with 160 g of 3 mm yttrium stabilized zirconia beads ("high wear resistant zirconia grinding media" from TOSOH Co.). The container was sealed and placed on rotating rolls for 7 days. After roll milling, the dispersion exhibited an average particle size of 265 nm as measured with a Malvern™ nano-S.

Preparation of the Capsules Containing a Leucodye

LD-CAPS-01 has been prepared by adding 2.1 g Tinuvin 928, 5.47 g LD-03, 1.22 g LD-05, 3.04 g LD-04, 4.87 g LD-06, 4.87 g LD-01 and 2.43 g LD-02 to 32 g ethyl acetate. Then, 23.1 g TAKENATE D120N was added to the mixture. The mixture was stirred at 70° C. during 10 minutes in order to dissolve the components after which 0.25 g IRD dissolved in 3 mL methylene chloride was added to the mixture. The mixture was then brought to 25° C. In a separate flask, 3 drops of OLFINE E1010 were added to 77 g MOWIOL 4 88 and 50 mL water. The ethyl acetate-based solution was added to the aqueous solution. The mixture was emulsified using a T25 digital Ultra-Turrax® with an 18N rotor commercially available from IKA at 20000 rpm during 5 minutes.

Ethyl acetate was removed under reduced pressure. During the process, also 20 mL of water was evaporated and therefore, the same amount of water was added to the mixture after evaporation. 2.5 g Tetraethylenepentamine in 15.5 mL water was added. This mixture was stirred for 16 hours at 65° C. and afterwards cooled to 25° C. Large particles were removed by filtering the mixture using a cloth filter with 60 μm pores.

LD-CAPS-02 was prepared in the same way as LD-CAPS-01, except that no infrared dye (IRD) is used.

Preparation of the Colour Developing Agent

DEV-01 has been prepared by adding in Pot A, 55 g of Arlo, 4.4 g Proxel Ultra 5 and 366.674 MOW were added to 524.601 g water. The mixture was stirred for 5 minutes at 50° C. in order to dissolve all components.

In Pot B, 10.725 g 4,4'-Thiobis(6-tert-butyl-m-cresol), 10.725 g Ralox 46, 33 g Tinuvin 928, 8.25 g DISFLAMOLL TKP, 4.125 g Ethyl Maleate and 181.5 g Zinc 3,5-bis(alpha methylbenzyl) salicylate were added to 495 g ethyl acetate. The mixture was stirred for 30 minutes at 50° C. in order to dissolve all components.

While Pot A was stirred with a HOMO-REX high speed homogenizing mixer, the solution in Pot B was added to Pot A. The mixture was further stirred during 5 minutes with the HOMO-REX mixer. Ethyl acetate was removed from the mixture under reduced pressure.

DEV-02 has been prepared by adding in Pot A 66.6 g MOW and 0.4 g PROXELK to 13 g water. The mixture was stirred and heated to 50° C. In Pot B, 10 g of DISFLAMOLL TKP and 10 g cyclohexyl p-toluene sulfonate were added to 40 g of ethyl acetate and heated to 50° C. until everything was completely dissolved. Pot B was added to pot A and the mixture was emulsified using a T25 digital Ultra-Turrax® with an 18N rotor, commercially available from IKA at 20000 rpm during 5 minutes. Ethyl acetate was removed from the mixture under reduced pressure.

Preparation of the PET Support PET-C

A coating composition SUB-1 was prepared by mixing the components according to the following Table 3.

TABLE 3

| wt % of components | SUB-1 |
|---|---|
| deionized water | 69.44 |
| CCE | 15.40 |
| Resorcinol | 12.55 |
| PAR-sol | 0.57 |
| PEA-sol | 0.68 |
| DOW-sol | 0.68 |
| Surfynsol | 0.68 |

A 1100 μm thick polyethylene terephthalate sheet was first longitudinally stretched and then coated on both sides with the coating composition SUB-1 at a wet coating thickness of 10 μm. After drying, the longitudinally stretched and coated polyethylene terephthalate sheet was transversally stretched to produce a double side subbed 63 μm thick sheet PET-C, which was transparent and glossy.

Example 2

This example illustrates that laser markable articles comprising an encapsulated leuco dye have a much better UV stability compared to laser markable articles comprising leuco dyes which are not encapsulated.

Preparation of the Laser Markable Laminates LML-01 to LML-02

An outer layer was prepared by coating the coating solution OUT-1 shown in Table 4 on one side of the PET-C foil at a wet coating thickness of 30 μm and dried at 90° C. during 6 minutes.

The Laser Markable Laminates LML-1 to LML-2 were then obtained by coating the coating solutions shown in Table 5 on the other side of the PET-C foil at a wet coating thickness of 30 μm and dried at 90° C. during 15 minutes.

TABLE 4

| Ingredient (g) | OUT-1 |
|---|---|
| MEK | 87.85 |
| Sunvac HH | 10.60 |
| TOSPEARL 145 | 0.02 |
| Tinogard AS | 1.50 |

TABLE 5

|  | LML-01 | LML-02 |
|---|---|---|
| DW | 9.4 | 4.1 |
| Buffer (pH 9) | 5.0 | 5.0 |
| DARAN 8100 | 19.5 | 19.5 |
| NaOH (81 g/L) | 0.2 | 0.3 |
| LD-DISP-01 | 7.6 | — |
| LD-DISP-02 | 1.0 | — |
| LD-CAPS-02 | — | 13.9 |
| CB-01 | 5.5 | 5.5 |
| DR306 | 2.0 | 2.0 |

Preparation of the Laser Markable Articles LMA-1 to LMA-2

The Laser Markable Laminates LML-1 to LML-2 were laminated on both sides of a 600 μm PETG CORE (from Wolfen) using an OASYS OLA 6H laminator (130° C.-220 sec).

Evaluation of the Laser Markable Articles LMA-1 to LMA-2

The laser markable articles LMA-01 and LMA-02 were evaluated on a Muehlbauer CL 54 equipped with a Rofin RSM Powerline E laser (10 W) (1064 nm, 35 kHz).

The optical density of the laser marked areas were measured in reflection using a spectrodensitometer type XRITE500 using a visual filter.

To test the UV stability, the exposed laser markable articles were kept in a weathering cabinet equipped with a Xenon lamp for 72 hours after which the increase of the background density (ΔDmin) is measured.

The maximum optical densities (ODmax), the background optical densities (ODmin) and the increase of the background density upon UV exposure are shown in Table 6.

TABLE 6

|  | ODmax | ODmin | ΔDmin |
|---|---|---|---|
| LMA-01 | 1.78 | 0.11 | >1.0 |
| LMA-02 | 1.69 | 0.18 | 0.02 |

It is clear from the results of Table 6 that the Laser markable articles wherein the leuco dyes are encapsulated have a much higher stability towards UV radiation exposure compared with laser markable articles wherein the leuco dyes are not encapsulated.

Example 3

This example illustrates that laser markable articles comprising an encapsulated leuco dye and a colour developing agent precursor according to Formula I have a higher maximal density upon exposure to IR radiation.

Preparation of the Laser Markable Laminates LML-03 and LML-04

LML-03 was prepared by adding 7.93 g of DEV-01 to 3.97 g of LD-CAPS-01 and 30 g of a 12 wt % Mowiol 4 88 solution. The mixture was subsequently stirred during 5 minutes at room temperature with a magnetic stirrer. The mixture was coated with an Elcometer Bird Film Applicator (from ELCOMETER INSTRUMENTS) on a PET-C support at a wet coating thickness of 50 μm and dried at 80° C. for 5 minutes in a circulation oven.

LML-04 was prepared in the same manner as LML-03 except that DEV-02 is used instead of DEV-01.

Preparation of the Laser Markable Articles LMA-03 and LMA-04

LMA-03 was prepared by laminating the laser markable laminate LML-03 on both sides of the white opaque core support CORE wherein the coated side of the laser markable laminate faces the white opaque core support CORE.

The lamination was performed using a Photonex-325 LSI laminator at a temperature of 110° C. and speed mode 1.

LMA-04 was prepared in the same way as LMA-04, except that the laser markable laminate LML-02 is used instead of LML-01.

Evaluation of the Laser-Markable Articles LMA-03 and LMA-04

An optically pumped semiconductor laser emitting at 1064 nm (Genesis MX 1064-10000 MTM from COHERENT) was used for producing a black wedge of 0.6 cm×0.6 cm square boxes of increasing optical density in the laser markable layer. The laser was used at a power level of 4 W measured at the sample, a dither of 0.025, a scan speed of 200 mm/s and at a pulse repetition rate of 10 kHz.

The optical density of the laser marked areas were measured in reflection using a spectrodensitometer type Gretag-Macbeth SPM50 using a visual filter.

The maximum optical densities (ODmax) and the background optical densities (ODmin) are shown in Table 7.

TABLE 7

|  | ODmax | ODmin |
|---|---|---|
| LMA-03 | 1.61 | 0.15 |
| LMA-04 | 2.57 | 0.13 |

From these results, it is clear that LMA-04, wherein as colour developing agent precursor cyclohexyl p-toluene sulfonate is used, has a significantly higher maximal optical density compared to LMA-03, wherein the commonly used Zinc 3,5-bis(alpha methylbenzyl) salicylate is used as colour developing agent.

The invention claimed is:

1. A laser markable composition comprising:
an aqueous medium;
capsules including a polymeric shell surrounding a core;
a color developing agent precursor; and
an optothermal converting agent; wherein
the core includes a leuco dye; and
the color developing agent precursor is represented by Formula (I) or Formula (II):

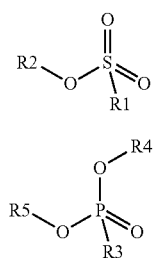

Formula I

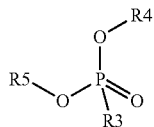

Formula II wherein

R1 and R3 independently represent an optionally substituted alkyl group, an optionally substituted (hetero)cyclic alkyl group, an optionally substituted (hetero)aryl group, an optionally substituted aralkyl group, an optionally substituted alkoxy group, an optionally substituted (hetero)cyclic alkoxy group, or an optionally substituted (hetero)aryl group;

R2, R4, and R5 independently represent an optionally substituted alkyl, an optionally substituted aliphatic (hetero)cyclic alkyl group, or an optionally substituted aralkyl group; and R1 and R2, R4 and R5, R3 and R4, and R3 and R5 may represent necessary atoms to form a ring.

2. The laser markable composition according to claim 1, wherein the color developing agent precursor is represented by Formula I.

3. The laser markable composition according to claim 2, wherein R1 is a tolyl group and R2 is a $C_1$ to $C_{22}$-alkyl group or a cycloalkyl group.

4. The laser markable composition according to claim 1, wherein the optothermal converting agent includes an infrared radiation absorbing dye, an infrared radiation absorbing pigment, or a combination thereof.

5. The laser markable composition according claim 4, wherein the infrared radiation absorbing dye is located in the core.

6. The laser markable composition according to claim 4, wherein the infrared radiation absorbing pigment includes carbon black.

7. The laser markable composition according to claim 1, wherein the polymeric shell includes a polymer selected from the group consisting of a polyamide, a melamine based polymer, a polyurea polymer, a polyurethane polymer, and copolymers thereof.

8. The laser markable composition according to claim 1, further comprising a dispersing group covalently bound to the polymeric shell.

9. The laser markable composition according to claim 8, wherein the dispersing group is selected from the group consisting of a carboxylic acid or salt thereof, a sulfonic acid or salt thereof, a phosphoric acid ester or salt thereof, a phosphonic acid or salt thereof, an ammonium group, a sulfonium group, a phosphonium group, and a polyethylene oxide group.

10. A laser markable article comprising:
a support; and
the laser markable composition as defined in claim 1 on the support.

11. The laser markable article according to claim 10, wherein the laser markable article is a security document precursor.

12. A method of preparing a laser marked article comprising the steps of:
providing the laser markable article as defined in claim 10; and
laser marking the laser markable article using an infrared laser.

* * * * *